United States Patent [19]

Berczi

[11] 4,425,398

[45] Jan. 10, 1984

[54] FABRICS FOR USE IN COMPOSITE SHEETING

[75] Inventor: Charles N. Berczi, Ormskirk, England

[73] Assignee: Milliken Research Corporation, Spartanburg, S.C.

[21] Appl. No.: 367,478

[22] Filed: Apr. 12, 1982

[51] Int. Cl.$^3$ .............................................. B32B 5/12

[52] U.S. Cl. .................................. 428/253; 428/254; 428/909

[58] Field of Search ....................... 428/253, 254, 909; 66/192, 195

[56] References Cited

U.S. PATENT DOCUMENTS 4,298,645 11/1983 Obayashi et al. .................. 428/253

*Primary Examiner*—Marion McCamish

*Attorney, Agent, or Firm*—Earle R. Marden; H. William Petry

[57] ABSTRACT

A fabric for use in the manufacture of rubberized composite sheeting suitable for use as printing blankets, is composed of a rigid warp knitted structure of fine man-made filament yarns A, an inlaid warp of smooth, coarse man-made filament yarns B and C, and a weft insertion of coarse textured man-made filament yarns D. The warp inlay and weft insertion do not interlace, so that a very flat and smooth surfaced fabric is achieved. The fabric may be rubberized by conventional techniques.

2 Claims, 2 Drawing Figures

FABRICS FOR USE IN COMPOSITE SHEETING

Figure 1:
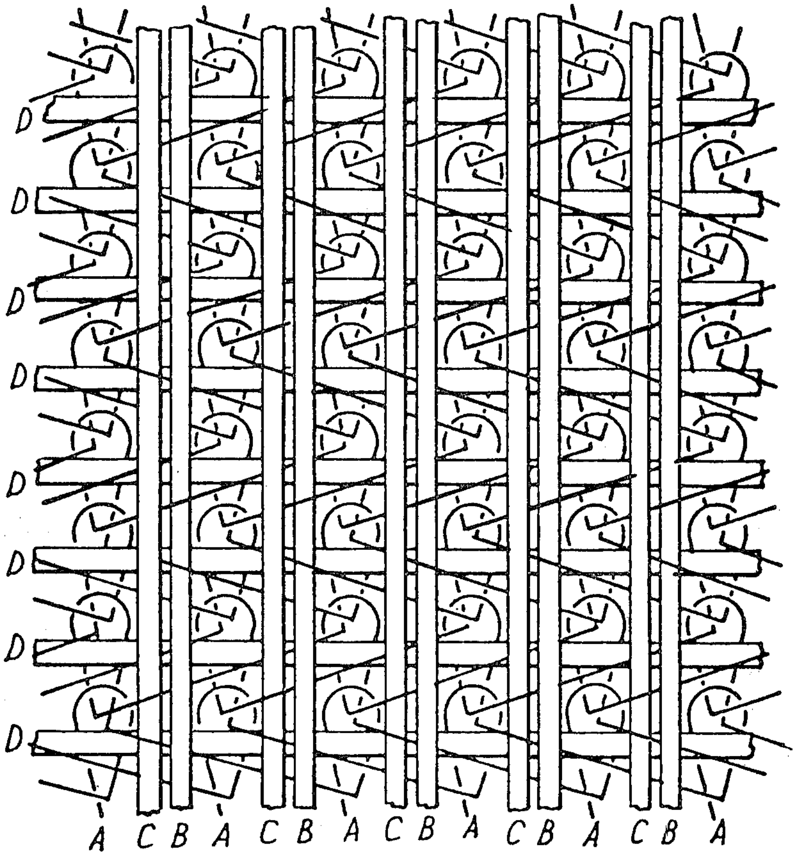

The present invention relates to composite sheeting, and more especially to fabrics suitable for use in the manufacture of printers' blankets and to blankets incorporating such fabrics.

Conventional offset printing blankets are composite materials composed of layers of woven fabric and rubber, presenting a smooth rubberized surface to receive the ink to be transferred. The woven fabric is usually composed of combed cotton in warp and weft, but may have high modulus spun rayon in either warp or weft. The main requirements for such a fabric are that it should have a high modulus in the warp direction (to prevent stretching of the blanket on the printing machine), be smooth and without slubs or knots, be stable under vulcanizing conditions and afford adequate adhesion to the rubber layers. The blanket should also be sufficiently flexible to pass round rollers in the printing machine, and afford adequate cushioning for printing.

The present invention seeks to provide a novel smooth-surfaced fabric of improved properties and an improved printers' blanket incorporating the fabric.

The fabric according to the invention comprises a rigid warp knitted base fabric composed of relatively fine yarn of continuous man-made filaments, closely spaced and relatively coarse inlaid warp yarns and closely spaced and relatively coarse and textured weft insertion yarns, the inlaid and insertion yarns being also composed of continuous man-made filaments and extending through the knitted structure without interlacing with one another, whereby one face of the fabric is substantially constituted by the inlaid warp yarns.

By "rigid" is herein meant that the fabric resists two-dimensional distortion in its own plane.

The fabric according to the invention has several advantages over the conventional fabric, because, apart from the basic knitted structure of fine yarn, the relatively coarse load-carrying warp and weft yarns do not interlace and lie completely flat, and there is no crimp in the warp and weft such as is imposed by a woven structure of similar strength. In consequence, the fabric has a higher modulus than a woven structure.

The absence of yarn interlacings and the use of closely spaced, smooth continuous filament yarns in the inlaid warp give the fabric an outstandingly smooth surface on the warp face.

The preferred yarns for the warp knitted base fabric are 33 dtex 6f polyester filament yarns. These fine yarns, preferably having a count in the range 33–110 dtex, contribute little to the load-carrying properties of the fabric or to the surface, but confer two-dimensional rigidity on the inlaid and inserted, but not interlaced, structure of warp and weft.

The preferred inlaid warp yarns are 550 dtex 96f polyester. These yarns are relatively coarse, for example, in the range 110–1100 dtex but are smooth and untextured. Being closely spaced in the fabric, and held rigidly in position by the knitted base, they provide a substantially continuous, smooth surface on one face of the fabric.

The weft insertion yarns are preferably textured or bulked yarns with a count in the range 120–1220 dtex. Examples of suitable yarns are air-textured nylon or polyester yarns, which may be analogous to "Taslanized" yarns although much heavier than the yarns usually textured by that process. Alternative yarns suitable for this purpose are torque-textured polyester yarns.

The bulked or textured weft yarns afford the desired cushioning and also offer a greater adhesion key to the rubber layer in the manufacture of printers' blankets.

In the manufacture of printers' blankets from the fabric of this invention, the fabric is prepared as necessary to receive its rubber coating and is then rubberized, for which purpose conventional application and vulcanizing techniques may be employed.

After being knitted, the fabric may be stretched in the warp direction and heat set in this condition to adjust the modulus as desired, followed by calendering to assist in closing gaps in the fabric structure and to increase the smoothness of the fabric surface.

If a key coat, for example, an isocyanate coat, is to be applied to enhance adhesion between the fabric and the rubber layers, this is conveniently coated after the calendering operation. Alternatively, a rubber-receptive yarn may be used, for example in the warp, with a resorcinol/formaldehyde latex adhesive dip treatment or other adhesive system know in the art. Printers' blankets according to the invention are thinner and lighter than conventional blankets of comparable strength without any sacrifice of rigidity or performance. They are also cheaper. Because of their reduced thickness, they are able to pass around smaller rollers without buckling at the inside surface and therefore more adaptable in their application.

Figure 2:
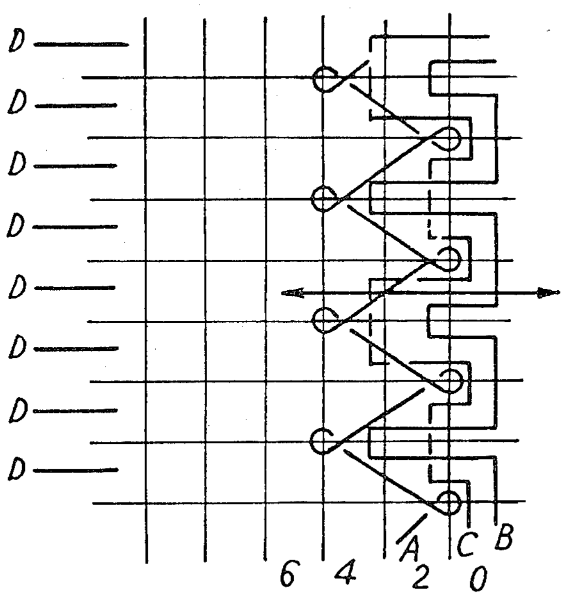

In the drawings:

FIG. 1 shows the structure of a preferred fabric for use in this invention; and, FIG. 2 is a knitting diagram for the fabric of FIG. 1.

In the drawings (FIGS. 1 and 2), A is the warp knitting yarn, B and C are the smooth, untextured warp inlay yarns, and D is the textured weft insertion yarn. The preferred yarn parameters are identified above. The threading of the machine is as follows:

A=Bar 1—Full
B=Bar 2—Full
C=Bar 3—Full
D=weft

In the knitting pattern shown in the diagram of FIG. 2, the warp yarns follow the arrangement:

| A | B | C |
|---|---|---|
| 2 | 0 | 0 |
| 0 | 0 | 0 |
| — | — | — |
| 4 | 4 | 2 |
| 6 | 4 | 2 |
| — | — | — |
| 2 | 0 | 0 |
| 0 | 0 | 0 |
| — | — | — |
| 4 | 2 | 4 |
| 6 | 2 | 4 |
| — | — | — |

Although when knitted with yarns of the character set forth above, the fabric structure described is outstandingly well adapted for use in composite sheeting such as printers' blankets, the structure is believed to be novel in its own right and, with the substitution of yarns of different characteristics (for example, extensible yarns), can be used to provide fabrics for a variety of different end uses.

I claim:

1. A printers blanket comprising: a rigid warp knitted fabric composed of relatively fine yarn of continuous man-made filaments, closely spaced and relatively coarse inlaid warp yarns and closely spaced and relatively coarse and textured weft insertion yarns, the inlaid and insertion yarns being also composed of continuous man-made filaments and extending through the knitted structure without interlacing with one another, whereby one face of the fabric is substantially constituted by the inlaid warp and a layer of vulcanized rubber coated on said one face of said knit fabric to provide a smooth surface on said face.

2. The blanket of claim 1 wherein the inserted weft yarn is a textured nylon or polyester filament yarn.

* * * * *